April 23, 1968 R. E. DENNEY ET AL 3,379,226
TANK COUPLING
Filed Oct. 21, 1965 2 Sheets-Sheet 1

INVENTORS
RAYMOND E. DENNEY
ROBERT G. COX
BY Jerry K. Harness
their ATTORNEY

April 23, 1968   R. E. DENNEY ET AL   3,379,226
TANK COUPLING
Filed Oct. 21, 1965                                          2 Sheets-Sheet 2
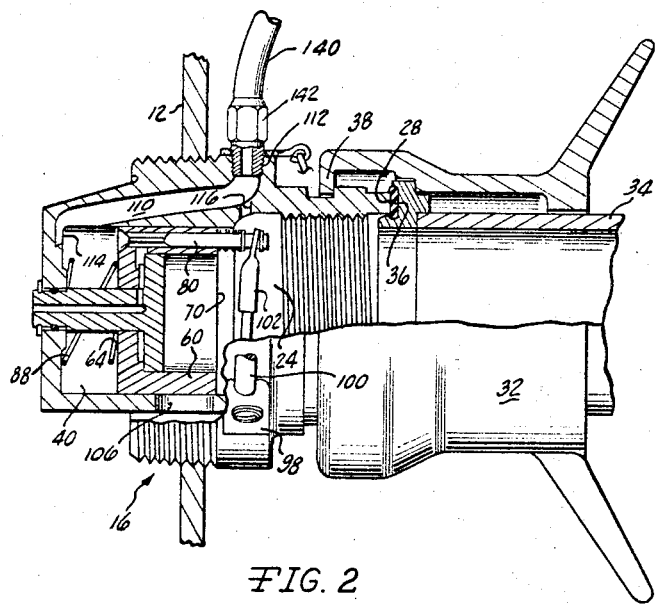
FIG. 2
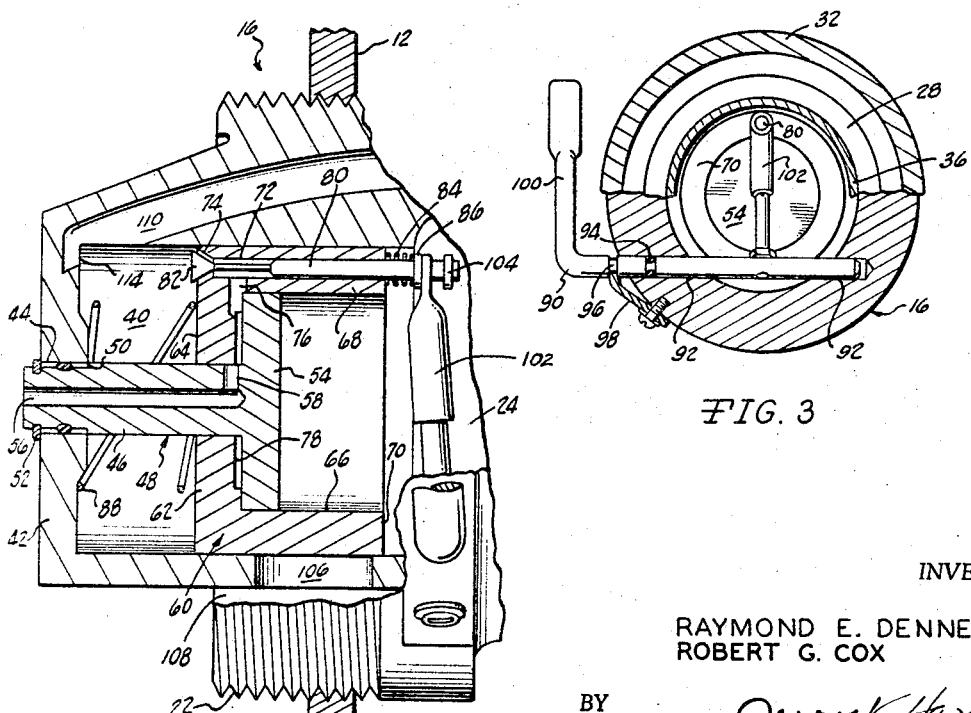
FIG. 3
FIG. 4
INVENTORS
RAYMOND E. DENNEY
ROBERT G. COX
BY
*their* ATTORNEY

United States Patent Office 3,379,226
Patented Apr. 23, 1968

3,379,226
TANK COUPLING
Raymond E. Denney, Jackson, and Robert G. Cox, Rives Junction, Mich., assignors to Aeroquip Corporation, Jackson, Mich.
Filed Oct. 21, 1965, Ser. No. 499,686
9 Claims. (Cl. 141—207)

ABSTRACT OF THE DISCLOSURE

An automatic shutoff and level control device preferably for railroad refueling systems employing an inlet valve having a sliding piston operated by differential pressure to close the valve when the tank is substantially full. Manual means are provided to override the automatic means.

---

Figure 1:
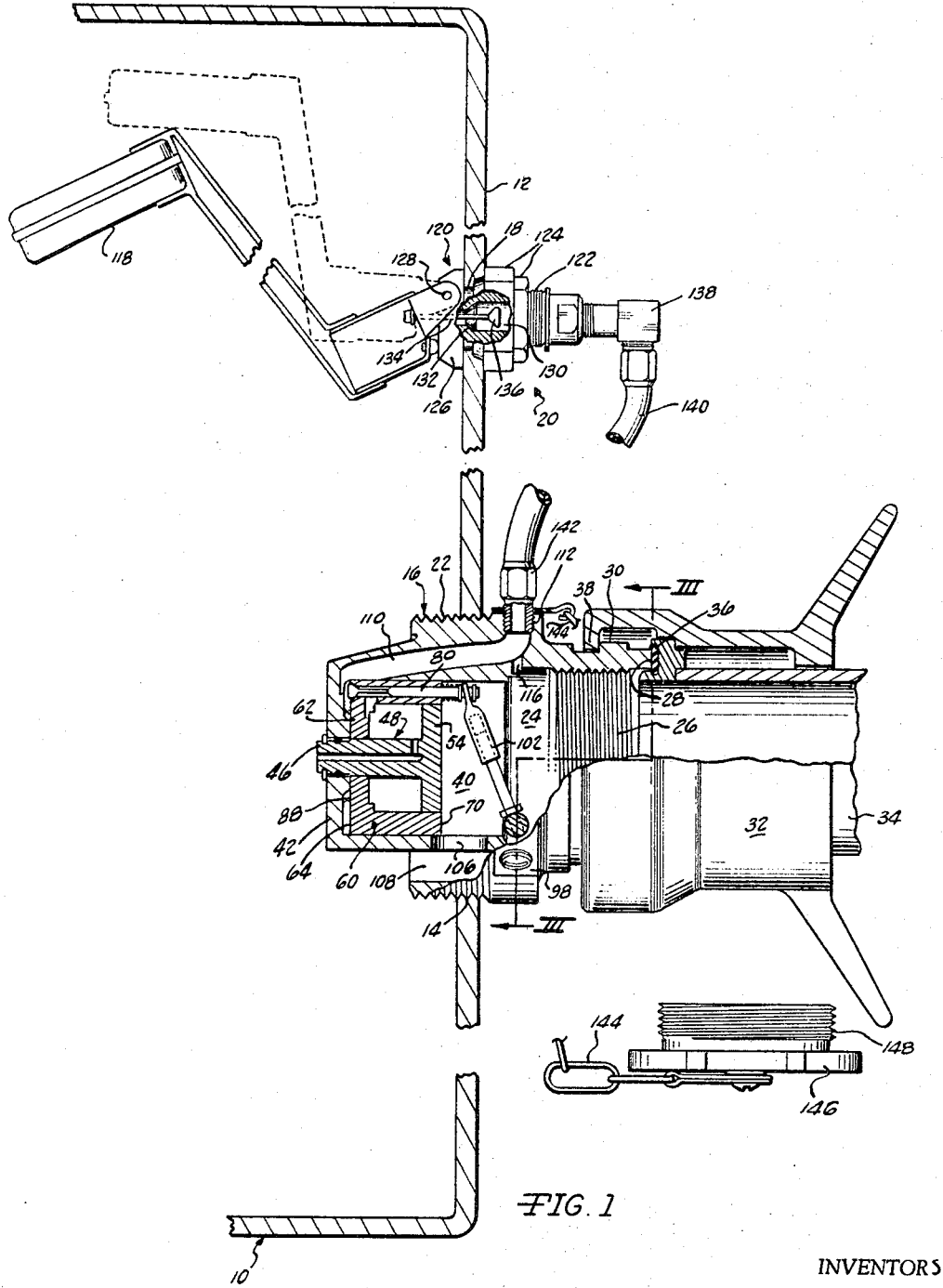

The invention pertains to a railroad refueling system, and particularly relates to refueling apparatus which automatically stops the flow of fuel upon a predetermined amount of fuel being received within the fuel tank. The present invention is an improvement over the assignee's United States Patent 3,076,486.

In the refilling of railroad fuel tanks, it is a common occurrence to spill a considerable amount of the diesel fuel upon the roadbed adjacent the refueling area. Spilling of the fuel usually occurs due to overfilling of the tanks, and from drainage from the supply hose after being disconnected from the fuel tank coupling.

It is an object of the invention to provide fuel tank filling apparatus which may be employed with railway rolling stock to provide a predetermined amount of fuel without the fuel tank becoming excessively full. Upon the desired amount of fuel being placed within the tank, filling thereof is automatically terminated.

An additional object of the invention is to provide an automatic filling system wherein the automatic control includes an "override" to permit manual "topping" of the fuel tank and to facilitate draining of the fuel supply hose.

A further object of the invention is to provide an automatically operated refueling system wherein the system may be readily adapted to existing fuel systems without extensive modification thereto and which may be installed completely from the exterior of the fuel tank.

An object of the invention is to provide an automatic shutoff apparatus wherein fuel flow is controlled by a valve positioned by the influence of the pressure of the fuel being supplied.

Another object of the invention is to provide a refueling apparatus which is completely automatic and dependable in operation and which employs a minimum of moving parts.

These and other objects of the invention arising from the details and relationships of the components of an embodiment thereof will be apparent from the following description and accompanying drawings wherein:

FIG. 1 is an elevational, partly sectional view of a fuel tank and the coupling and float components constituting the invention, the components being shown during the filling operation, FIG. 2 ise an elevational, detail, sectional view of the coupling illustrating the valve components in the fully closed position, FIG. 3 is an elevational, sectional view taken along section III—III of FIG. 1, and FIG. 4 is an enlarged, detail, elevational, sectional view of the coupling with the primary valve being in the closed position and the override control valve open and prior to manually displacing the primary valve to the left.

The general arrangement of the basic components of the invention is best appreciated from FIG. 1. In FIG. 1 a fuel tank, such as that used in a diesel railroad locomotive, is illustrated at 10. The fuel tank includes a vertical wall 12 having a threaded opening 14 into which the fuel inlet coupling 16 is threaded. Adjacent the upper regions of the tank, an opening 18 is formed in the tank wall 12 for receiving the float mechanism 20.

The inlet coupling 16 is of a generally cylindrical configuration, including threads 22 defined on the exterior thereof for cooperating with the threaded tank opening 14. Internally, the inlet coupling 16 is provided with a bore 24 in which threads 26 are defined adjacent the coupling open end 28. Obliquely disposed partial thread bosses 30 are formed on the exterior of the coupling adjacent the end 28 whereby the swivel nut 32 of the fuel supply conduit 34 may be threadedly connected to the inlet coupling 16 with a "quick connect" action. The supply conduit 34 includes an annular seal and seal support assembly 36 for sealing cooperation with the coupling end 28 when the conduit and the coupling are connected as shown in FIGS. 1 and 2. The thread bosses 30 and the mating lip 38 formed on the nut 32 are of such configuration that an operative connection is made between the coupling 16 and the conduit 34 with approximately a one-quarter turn of the nut.

The coupling 16 includes a cylindrical chamber 40 communicating with the bore 24 which is substantially concentric thereto. The coupling inner end wall 42 is provided with a cylindrical opening 44 concentric with the chamber 40 which receives the stem 46 of a headed element 48. The element 48 is fixed relative to the coupling 16 by means of the shoulder 50 enagaging the coupling adjacent the opening 44 and by means of the snap ring 52 received within a groove defined in the stem. The element 48 also includes a cylindrical head 54 of a diameter considerably less than the diameter of the chamber 40. An axial passage 56 is defined in the stem 46 which communicates with a radial passage 58 extending to the surface of the stem adjacent the head 54. The left end of the passage 56 communicates with the left end of the stem 46 and the interior of the tank 10.

A cup-shaped piston valve 60 is received within the chamber 40 for axial movement therein betwen the open and closed positions shown in FIGS. 1 and 2, respectively. The piston valve includes a radial portion 62 having a concentric opening defined therein which closely, but slidably, receives the stem 46. The face 64 of the radial portion 62 constitutes the larger area pressure face of the piston. Internally, the piston 60 is provided with a cylindrical recess 66 which internally defies the piston cylindrical wall portions 68. The recess 66 is adapted to closely and slideably receive the element head 54. The annular surface 70 defined on the piston 60 constitutes the small pressure area face of the piston and, in a preferred embodiment of the invention, the area of the pressure face 64 is approximately twice that of the pressure face 70.

A relatively weak compression spring 88 is interposed between the piston valve radial portion 62 and the end wall 42 of the coupling 16 tending to bias the piston valve toward the right or closed position.

The piston wall portion 68 is provided with an axially extending bore 72 which terminates adjacent the face 64 in a conical seat 74. A radially extending passage 76 communicates with an annular recess 78 defined in the piston radial portion 62 disposed toward the head 54.

A poppet-type valve 80 is slideably received within the bore 72 and includes a conically shaped valve head 80 for cooperating with the conical seat 74. The compression spring 84 interposed between the piston face 70 and an abutment 86 defined on the valve 80 biases the valve toward the right or "closed" position.

The valve 80 is manually actuated by a lever 90 rotatably journaled within a transverse bore 92 defined in the coupling 16, FIG. 3. As the lever 90 intersects the coupling bore 24, a seal 94 is provided to prevent leakage of fuel along the lever. A groove 96 defined in the lever cooperates with a retainer 98 affixed to the coupling body which prevents axial movement of the lever. Exteriorly, the lever is provided with a handle 100, and interiorly an extension 102 is affixed to the lever for cooperation with the valve 80 intermediate the abutments 86 and 104, whereby a slight lost motion connection with the valve is permitted, as will be apparent from FIG. 4. Thus, by pivoting the exteriorly accessible handle 100 toward the rear of the coupling 16, the valve head 82 may be unseated from the valve seat 74.

The coupling 16 is provided with a plurality of large ports 106, usually three, one of which is shown, which establishes communication between the chamber 40 and the fuel tank 10. Such communication is possible, in that the coupling 16 is recessed at 108. Thus, when the piston valve 60 is in position shown in FIG. 1, fuel within the coupling bore 24 and chamber 40 is able to freely flow into the fuel tank.

The coupling 16 includes a passage 110 communicating with a threaded opening 112 and the rear of the chamber 40 at 114, as will be appreciated from FIGS. 1 and 2. A small orifice 116 establishes communication between the passage 110 and the bore 24.

Sensing of the liquid level within the fuel tank 10 is achieved through the float mechanism 20 which includes a float 118 pivotally mounted on support member 120 having a threaded stem 122 upon which nuts 124 may be threaded. The support 120 is of such configuration as to include a portion 126 which may be inserted through the opening 18 and then aligned, whereby tightening of the nuts 124 firmly affixes and seals the support 120 to the tank. The portion 126 serves as the direct support for the float 118 which is pivotally mounted thereon at 128. Of course the float 118 is of such dimension as to also fit through opening 18.

The stem 122 includes an internal passage 130 communicating with the tank 10 through a conical valve seat 132. A valve stem 134 having a tapered valve head 136 affixed thereto is mounted upon the float 118, whereby raising of the float to the dotted line position of FIG. 1 causes the valve head 136 to seat upon the seat surface 132 and close passage 130. A fitting 138 communicates with the passage 130, and a hose 140, or other conduit, connects the fitting 138 with the coupling passage opening 112 through fitting 142.

In the described embodiment, the fitting 142 is also used to attain a chain 144 to the coupling 16 to which a dust cover 146 is attached. The dust cover 146 includes threads 148 adapted to cooperate with the threads 26 such that when the fluid conduit 34 and nut 32 are removed from the coupling 16, the dust cover may be screwed thereon to protest the internal components of the coupling from damage or dirt.

Operation of the apparatus of the invention is as follows:

Under normal conditions the piston valve 60 will be moved to the right, as shown in FIGS. 2 and 4. The spring 88 biases and maintains the piston in this relationship, and in this position the piston portion 68 is superrmposed over the ports 106 to seal the interior of the fuel tank from the coupling chamber 40. Movement of the piston 60 to the right is limited by the engagement of the piston radial portion 62 with the element head 54. The dust cover 146 will normally be in engagement with the coupling open end 28, and the valve 80 would be in the closed position as shown in FIG. 2, in that the spring 84 will be biasing the valve to the right.

When it is desired to fill the tank 10, the supply conduit 34 is affixed to the coupling 16 after the dust cover 146 has been removed. The conduit 34 is quickly affixed to the coupling 16 by means of the nut lips 38 and the coupling thread boses 30. Fuel under pressure is then supplied to the coupling by means of the supply conduit. The fuel pressure will act upon the piston face 70 and bias the piston valve 60 to the left as fuel in chamber 40 is bled off through passage 110 to uncover the ports 106 and permit the fuel to freely flow into the tank 10. As the fluid level within the tank 10 will be relatively low, the float 118 will be in the full line position shown in FIG. 1 wherein the vave head 136 is not seated and fluid entering the passage 110 through the coupling orifice 116 is free to flow into the hose 140, into the float stem passage 130 and into the tank 10.

When the tank 10 is substantially filled, the float 118 will rise to the dotted line position of FIG. 1. This movement of the float seats the valve head 136 upon the seat 132, preventing further escape of the fluid entering the hose 140 and passage 130. Thus, as the fluid entering the passage 110 through the orifice 116 can no longer pass into the tank 10, the fluid pressure within the passage 110 equalizes with the pressure within the coupling bore 24 and chamber 40. As the area of the piston face 64 is twice that of the piston face 70, the piston is moved to the right, as shown in FIG. 2, by the fluid pressure acting thereon. This movement of the piston covers the ports 106 and stops the flow of fuel to the tank 10.

If it is desired to "top" the fuel tank manually to permit the maximum amount of fuel possible to enter the tank 10, the operator pivots the handle 100 toward the tank. This action unseats the piston valve head 82, as shown in FIG. 4. Unseating of the valve head 82 permits fluid within the passage 110 and within the chamber 40 at the left of the piston 60, FIG. 4, to escape through the bores 72, 76, recess 78, and passages 58 and 56 into the fuel tank. As the opening at the valve seat 74 and the fluid passages associated therewith are slightly greater than the diameter of the orifice 116, the pressure acting upon the left of the piston valve 60 is reduced and manual force exerted on the piston by the lever extension 102, due to the full compression of the spring 84, will move the piston 60 to the left to uncover the ports 106 and permit additional fuel to enter the tank 10. Upon the operator releasing the handle 100, the valve 80 will close and the pressure acting upon the piston 60 will once again move the piston to the right to close the ports 106.

The lever 90 is also useful in relieving the pressure within the supply conduit 34 after closing conduit 34 line valve (not shown) for relieving the supply conduit pressure prior to disconnection from the coupling 16, in that by moving the valve 80 to the position of FIG. 4 without moving the piston 60, the pressure within the supply conduit can be relieved after the ports 106 have been closed.

After the supply conduit 34 is disconnected from the coupling 16, by unthreading the nut 32, the dust cover 146 may be replaced and the refueling operation is completed.

While the spring 88 is not essential to the automatic operation of the piston 60, the spring 88 insures that the piston 60 will be located over the ports 106 when the supply conduit is disconnected to thereby prevent spillage.

It is appreciated that various modifications to the invention may be apparent to those skilled in the art without departing from the spirit and scope thereof, and it is intended that the invention be defined only by the scope of the following claims.

We claim:

1. Automatic shutoff and level control apparatus comprising, in combination,
    (a) a tank having an interior and an opening defined in a wall thereof,
    (b) a coupling body having a bore defined therein,
    (c) coupling means defined on said body adapted to permit fluid supply means to be connected to said body in communication with said bore, (d) a chamber defined in said coupling body in communication with said bore, (e) an outlet defined in said body communicating with the interior of said tank, (f) a port defined in said body communicating with said outlet and selectively communicating with said bore, (g) a differential area piston mounted within said chamber movable between first and second positions, said piston having a large area pressure face and an opposed small area pressure face, said piston small area pressure face being directly subjected to fluid pressure within said bore, (h) piston-operated means adapted to selectively seal and open said port relative to said bore, said means sealing said port with respect to said bore at said piston first position and opening said port at the piston second position, (i) a passage establishing communication between said bore and the portion of said chamber communicating with the piston large pressure face, (j) a float mounted within the interior of said tank, (k) a conduit communicating with said passage and the interior of said tank, and (l) a valve within said conduit controlling fluid flow therethrough, said valve being connected to and operated by said float.

2. In an automatic shutoff and level control apparatus as in claim 1 wherein, (a) valve means are located within said coupling body adapted to selectively establish communication between said passage and tank interior to relieve fluid pressure within said passage, and (b) a valve means operator mounted on said body and connected to said valve means for the operation thereof, said operator having a handle portion exterior of said body.

3. In an automatic shutoff and level control apparatus as in claim 2 wherein, (a) said valve means located wtihin said coupling body is disposed within said piston.

4. Automatic shutoff and level control apparatus comprising, in combination, (a) a tank having an interior and an opening defined in a wall thereof, (b) a coupling body having a bore defined therein, said body being mounted within said tank opening, (c) coupling means defined on said body adapted to permit fluid supply means to be connected to said body in communication with said bore, (d) a cylindrical walled chamber defined in said coupling body in communication with said bore, (e) an outlet defined in said body communicating with the interior of said tank, (f) a port defined in said chamber wall communicating with said outlet, (g) a differential area piston mounted within said chamber movable between first and second positions, said piston having opposed large and small pressure area faces, said piston adapted to seal said port from said chamber at said first position and establish communication between said port and chamber at said second position, said piston small area pressure face being directly subjected to fluid pressure within said bore, (h) a passage establishing communication between said bore and the portion of said chamber communicating with the piston large pressure face, (i) a float mounted within the interior of said tank, (j) a conduit communicating with said passage and the interior of said tank, and (l) a valve within said conduit controlling fluid therethrough, said valve being connected to and operated by said float.

5. In an automatic shutoff and level control apparatus as in claim 4 wherein, (a) valve means are located within said coupling body adapted to selectively establish communication between said passage and tank interior to relieve fluid pressure within said passage, and (b) a valve means operator mounted on said body and connected to said valve means for the operation thereof, said operator having a handle portion exterior of said body.

6. In an automatic shutoff and level control apparatus as in claim 4 wherein, (a) a headed element is mounted in said coupling body within said chamber and concentric thereto, said element including an elongated stem and a head, a passage defined in said stem communicating with said tank interior, (b) said piston being of a cup-like configuration including a radial portion and a cylindrical portion, said element head being received within said piston cylindrical portion, (c) a passage defined in said piston adapted to establish communication between the large area pressure face and said stem passage, (d) a valve within said piston passage regulating fluid flow therethrough, and (e) a valve operator mounted on said coupling body adapted to operate said piston-mounted valve and having a handle portion exterior of said coupling body.

7. In an automatic shutoff and level control apparatus as in claim 6 wherein, (a) stop means are mounted on said valve within said piston passage limiting movement of said valve relative to said piston whereby movement of said valve operator may be transmitted to said piston.

8. In an automatic shutoff and level control apparatus as in claim 4 wherein, (a) a passage is defined in said piston communicating with said tank interior and the large pressure area face, (b) a valve within said passage controlling fluid flow therethrough, (c) a valve actuator movably mounted on said coupling body, and (d) lost motion means interconnecting said valve actuator to said piston-mounted valve.

9. Automatic shutoff and level control apparatus comprising, in combination, (a) a tank having an interior and an opening defined in a wall thereof, (b) a coupling body having a bore defined therein, (c) coupling means defined on said body adapted to permit fluid supply means to be connected to said body in communication with said bore, (d) a chamber defined in said coupling body in communication with said bore, (e) an outlet defined in said body communicating with the interior of said tank, (f) a port defined in said body communicating with said outlet and selectively communicating with said bore, (g) a differential area piston mounted within said chamber movable between first and second positions, said piston having a large area pressure face and an opposed small area pressure face, said piston small area pressure face being directly subjected to fluid pressure within said bore, (h) piston-operated means adapted to selectively seal and open said port relative to said bore, said means sealing said port with respect to said bore at said piston first position and opening said port at the piston second position, (i) a passage establishing communication between said bore and the portion of said chamber communicating with the piston large pressure face,
(j) a level sensing device mounted within the interior of said tank,
(k) a conduit communicating with said passage and the interior of said tank, and
(l) a valve within said conduit controlling fluid flow therethrough, said valve being connected to and operated by said sensing device.

References Cited

UNITED STATES PATENTS 2,796,090  6/1957  Carriol _____ 141—198

FOREIGN PATENTS 27,947  3/1907  Austria.

LAVERNE D. GEIGER, *Primary Examiner.*

H. S. BELL, *Assistant Examiner.*